Figure 4:
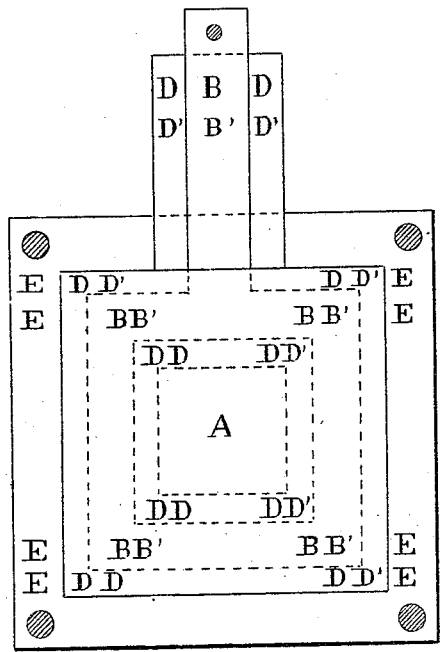

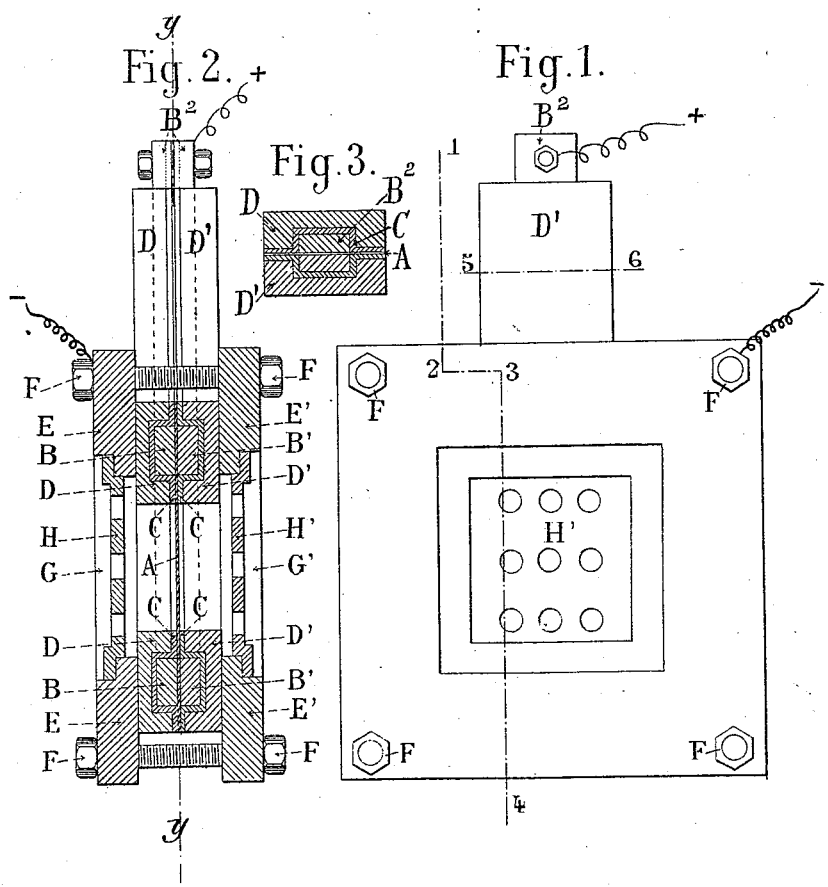

(No Model.)  
2 Sheets—Sheet 2.

A. E. W. BOUCHER.
SECONDARY BATTERY.

No. 553,831.  
Patented Feb. 4, 1896.

UNITED STATES PATENT OFFICE.

ANTHELME ERNEST WILLEM BOUCHER, OF PRILLY, SWITZERLAND, ASSIGNOR TO THE SOCIÉTÉ D'ELECTRO-CHIMIE, OF PARIS, FRANCE.

SECONDARY BATTERY.

SPECIFICATION forming part of Letters Patent No. 553,831, dated February 4, 1896.

Application filed August 13, 1895. Serial No. 559,120. (No model.)

*To all whom it may concern:*

Be it known that I, ANTHELME ERNEST WILLEM BOUCHER, a citizen of Switzerland, residing at Prilly, Switzerland, have invented certain new and useful Improvements in Secondary or Storage Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to a storage or secondary battery of that class in which the positive electrode immersed in an electrolytic liquid is formed of a thin sheet of gold, platinum or other non-oxidizable metal unaffected by the chlorides, sulphides, &c., deposited upon its surface during the charge or discharge of the battery, and in such connection it relates more particularly to the construction and arrangement of such a battery.

The principal objects of my present invention are, first, to provide a simple, durable and efficient electrode for a storage or secondary battery, and, second, to provide in a storage-battery a positive electrode consisting of one or more thin sheets or plates of a non-oxidizable metal adapted to receive the charging-current on the entire perimeter or periphery and supported between metallic frames protected from oxidation and the electrolytic liquid by one or several layers of insulating material and enveloped by a metallic frame supporting the negative electrode.

My invention consists of the improvements in a secondary or storage battery, as hereinafter described and claimed.

The nature, characteristic features, and scope of my invention will be more fully understood from the following description, taken in connection with the accompanying drawings, forming part hereof, and in which—

Figure 1 is a side elevation of a storage-battery electrode removed from the electrolytic liquid and embodying features of my invention. Fig. 2 is a vertical section thereof taken on the lines 1, 2, 3, and 4 of Fig. 1. Fig. 3 is a cross-section taken on the line 5 6 of Fig. 1; and Fig. 4 is a vertical central section taken on the line *y y* of Fig. 2.

Referring to the drawings, A represents a thin sheet of non-oxidizable metal, such as gold, rubidium, cæsium or the like, which sheet is likewise unaffected by the electrolysis of the aqueous solutions of chlorides, sulphides and the like into which the sheet is to be immersed to constitute the anode or positive electrode of a storage-battery. This sheet A is firmly clamped between two frames B B', of copper or similar base metal, which frames are completely surrounded by layers C C', of insulating material, to protect the frames B B' from the electrolytic fluid of the battery. These layers C C' are held in position by frames D D', of ebonite or similar material.

The sheet A, frames B B', layers C C', of insulating material, and frames D D', of ebonite, are clamped together between the outer frames, E E', by means of bolts F F'. These outer frames, E E', are preferably of metal, such as cast-iron, and are recessed and open, as at G G', to receive the perforated plates H H', constituting the cathodes or negative electrodes of the battery. Each of the frames B B', between which the sheet of gold A is held, is provided with an upper projection or arm $B^2$, forming the terminal of the battery. This terminal $B^2$ incloses the plate A at its upper end and is surrounded by the insulating material C C' and the frames D D', of ebonite.

Hitherto in those electric storage-batteries wherein the electrolyte consisted of aqueous solutions of a chloride, in order to avoid disintegration of the positive electrode or anode by reason of oxygen and the chlorides collecting upon its face during charge and discharge, it was necessary to form such electrode of a precious metal, such as gold, platinum, and similar metals. As the intensity of the current cannot be carried beyond a certain limit, owing to the resistance of the electrolyte, it is necessary that the anode should present an extensive surface, but owing to the great cost of the metal it is imperative to diminish the quantity of metal employed. For these reasons the anode must be made of a very thin sheet or leaf, and both sides of the leaf must be utilized. It has been suggested in this connection that the current should enter at one side of the leaf and depart at the other side thereof. This construction, however, renders it necessary that both the anode and cathode shall be of gold or similar precious metal and shall be of equal form and size. Again, by this construction a large percentage of electrical energy is lost by reason of the great resistance of these thin sheets. To avoid these objections I have, as before described, made the anode of my battery a thin sheet of gold or similar non-oxidizable metal and surrounded its entire perimeter by a metallic frame held in position by a supplemental frame of copper, one arm of which constitutes the terminal of the battery. By reason of this arrangement the current is introduced to the anode at all points of its perimeter. The negative electrode in my battery consists of a base metal, such as copper, perforated to permit the electrolyte to circulate and to reach the anode, which is surrounded on both sides by the cathode.

The electrolyte which I prefer to use is a solution of alkaline or alkaline terreous chlorides. The current decomposes the water, setting free the hydrogen, while the oxygen combines with the chloride to form chlorates. I do not, however, desire to limit myself to the use of such an electrolyte, and it is manifest that a solution which in reaction will form chlorine and soda or similar reactions may be used.

Having thus described the nature and objects of my invention, what I claim as new, and desire to secure by Letters Patent, is—

1. An electric couple for secondary or storage batteries, consisting of an anode, comprising one or more thin sheets of non-oxidizable precious metal, the entire perimeter of which is inclosed in a metallic frame adapted to conduct the current to said perimeter of the anode, said frame protected by a layer of insulating material from the electrolyte, and a cathode of non-precious metal surrounding the insulated frame of the anode and supported by said frame at an invariable distance from the anode, substantially as described.

2. In a secondary or storage battery, an anode consisting of a thin sheet or sheets of non-oxidizable metal, metallic frames supporting said sheet or sheets and adapted to conduct the current to the entire perimeter of said anode, a layer of insulating material surrounding the frames to protect the same from the electrolyte, a metallic envelope or frame surrounding the anode, and adapted to receive and support the cathodes, substantially as described.

In testimony whereof I affix my signature in presence of two witnesses.

ANTHELME ERNEST WILLEM BOUCHER.

Witnesses:
OTTO H. MAY,
BENJ. H. RIDGELY.